United States Patent
Chang et al.

(10) Patent No.: US 9,520,902 B2
(45) Date of Patent: Dec. 13, 2016

(54) READER AND RFID READER

(71) Applicant: Wistron NeWeb Corp., Hsinchu (TW)

(72) Inventors: Chung-Ping Chang, Hsinchu (TW);
Kun-Sung Liu, Hsinchu (TW);
Chia-Chang Liu, Hsinchu (TW);
Chun-Hsiung Chuang, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 0 days.

(21) Appl. No.: 14/807,179

(22) Filed: Jul. 23, 2015

(65) Prior Publication Data

US 2016/0104015 A1   Apr. 14, 2016

(30) Foreign Application Priority Data

Oct. 13, 2014 (TW) .............................. 103135325 A

(51) Int. Cl.
*H04Q 5/22* (2006.01)
*H04B 1/00* (2006.01)
*G06K 7/10* (2006.01)
*H04B 1/04* (2006.01)
*H04B 1/18* (2006.01)

(52) U.S. Cl.
CPC ............. *H04B 1/00* (2013.01); *G06K 7/10009* (2013.01); *H04B 1/0458* (2013.01); *H04B 1/18* (2013.01)

(58) Field of Classification Search
CPC ............ H03H 9/706; H03H 9/46; H03H 7/48; H03H 9/725; H04B 1/0475; H04B 1/406
USPC ...................................................... 340/10.5
See application file for complete search history.

(56) References Cited

U.S. PATENT DOCUMENTS

| 6,721,544 | B1* | 4/2004 | Franca-Neto | ............ H04B 1/52 333/172 |
|---|---|---|---|---|
| 6,838,989 | B1 | 1/2005 | Mays et al. | |
| 7,439,860 | B2 | 10/2008 | Andresky | |
| 8,140,033 | B2 | 3/2012 | Chan Wai Po et al. | |
| 8,249,538 | B2 | 8/2012 | Jin et al. | |
| 9,331,720 | B2* | 5/2016 | Presti | ................... H04B 1/0458 |
| 2010/0069011 | A1 | 3/2010 | Carrick et al. | |
| 2011/0267194 | A1* | 11/2011 | Hong | ..................... H01P 5/185 340/572.7 |
| 2012/0041699 | A1 | 2/2012 | Sestok | |
| 2013/0077360 | A1 | 3/2013 | Low et al. | |
| 2013/0314288 | A1 | 11/2013 | Tayrani et al. | |
| 2014/0119244 | A1* | 5/2014 | Steer | ..................... H04B 1/525 370/278 |

* cited by examiner

*Primary Examiner* — Don N Vo
(74) *Attorney, Agent, or Firm* — Muncy, Geissler, Olds & Lowe, P.C.

(57) ABSTRACT

A reader is provided, including a power amplifier (PA), a low-noise amplifier (LNA), a circulator, an auto-tuning matching network, and a control circuit. The PA emits a first RF transmission signal. The LNA transmits a first RF induced signal corresponding to the first RF transmission signal. The circulator is coupled between the PA and LNA, transmits the first RF transmission signal to an RF connection terminal or receives the first RF induced signal from the RF connection terminal. The auto-tuning matching network is coupled to the circulator, matches impedances between the circulator and the RF connection terminal. The control circuit is coupled to the auto-tuning matching network, adjusts the auto-tuning matching network to match impedances between the circulator and the RF connection terminal.

8 Claims, 4 Drawing Sheets

READER AND RFID READER

CROSS REFERENCE TO RELATED APPLICATIONS

This application claims priority of Taiwan Patent Application No. 103135325, filed on Oct. 13, 2014, and the entirety of which is incorporated by reference herein.

BACKGROUND OF THE INVENTION

Field of the Invention

The present invention relates to wireless communication technology, and in particular to a reader in an Radio Frequency Identification (RFID) system.

Description of the Related Art

Radio Frequency Identification (RFID) is a wireless communication technology which reads and writes data by transmitting a wireless signal to identify a specific object by an RFID reader without the need for mechanical or optical contact between the identification system and the specific object.

Presently, an RFID reader typically will adopt a directional coupler to isolate the transmitting end from the receiving end, causing considerable signal attenuation at the receiving end, resulting in insufficient sensitivity of the receiving end.

Therefore an RFID reader is needed that increases receiver sensitivity while providing good isolation between the transmitting end and the receiving end.

BRIEF SUMMARY OF THE INVENTION

In one aspect of the invention, a reader is disclosed, comprising a power amplifier, a low noise amplifier, a circulator, an automatic-matching-and-tuning circuit and a control circuit. The power amplifier is configured to output a first Radio Frequency (RF) transmission signal. The low noise amplifier is configured to transmit a first RF response signal according to the first RF transmission signal. The circulator, coupled between the power amplifier and the low noise amplifier, is configured to transmit the first RF transmission signal to an RF connection node or receive the first RF response signal from the RF connection node. The automatic-matching-and-tuning circuit, coupled to the circulator, is configured to perform impedance matching between the RF connection node and the circulator. The control circuit, coupled to the automatic-matching-and-tuning circuit, is configured to adjust the automatic-matching-and-tuning circuit to perform impedance matching between the RF connection node and the circulator.

In another aspect of the invention, an RFID reader is provided, comprising a power amplifier, a low-noise amplifier, a mixer, a selectable filter, a circulator, an automatic-matching-and-tuning circuit and a control circuit. The power amplifier is configured to output a first Radio Frequency (RF) transmission signal. The low-noise amplifier is configured to transmit a first RF response signal according to the first RF transmission signal, wherein the first RF response signal carries an upper-tag signal and a lower-tag signal and the first RF transmission signal has the same RF frequency as the first RF response signal. The mixer, coupled to the low-noise amplifier, is configured to down-convert the first RF response signal. The selectable filter, coupled to the mixer, is configured to filter the down-convert upper-tag and lower-tag signals, and select a clearer one from the filtered upper-tag and lower-tag signals to output. The circulator, coupled between the power amplifier and the low-noise amplifier, is configured to transmit the first RF transmission signal to an RF connection node or receive the first RF response signal from the RF connection node. The automatic-matching-and-tuning circuit, coupled to the circulator, is configured to perform impedance matching between the RF connection node and the circulator. The control circuit, coupled to the automatic-matching-and-tuning circuit, is configured to adjust the automatic-matching-and-tuning circuit to perform impedance matching between the RF connection node and the circulator.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Figure 1:
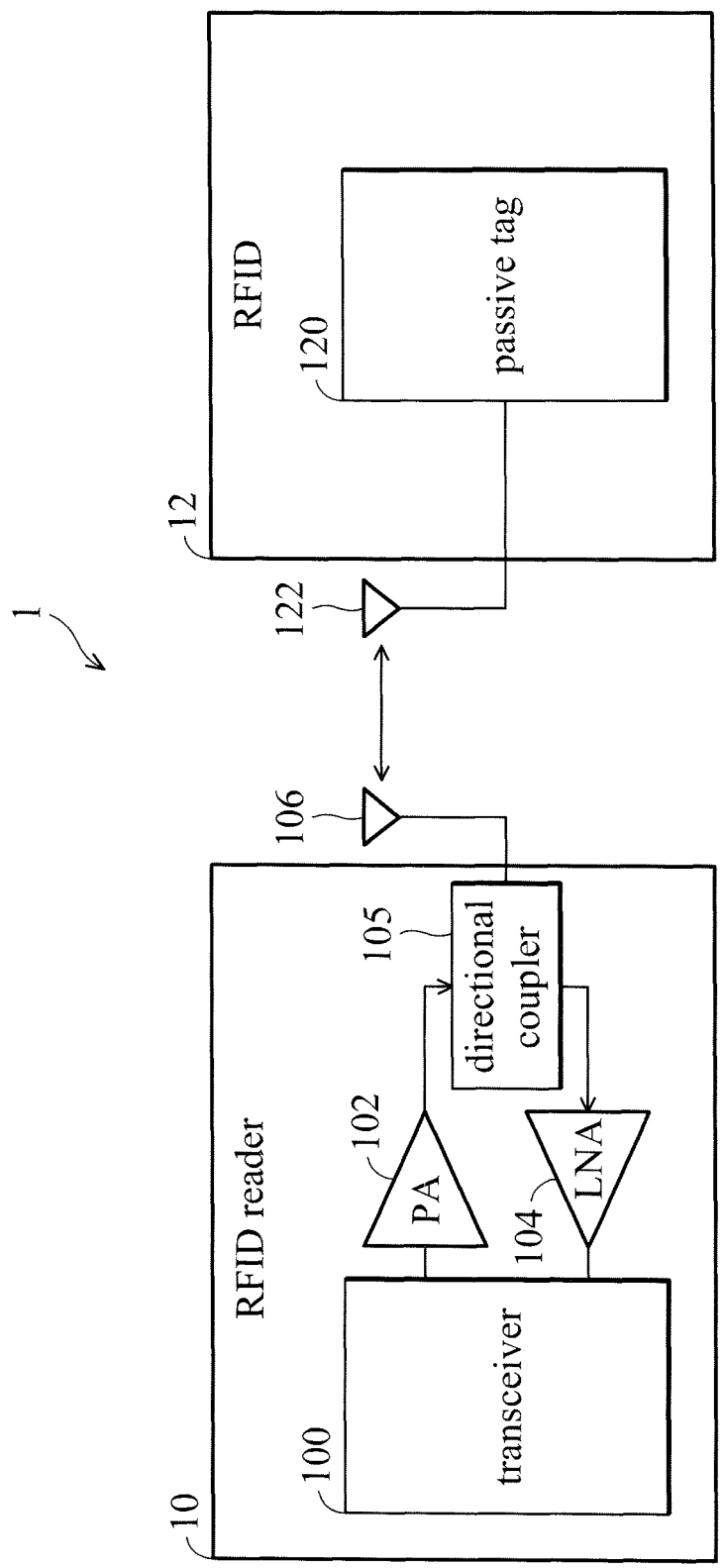
FIG. 1 is a block diagram of an RFID system 1 according to an embodiment of the invention.

FIG. 1 is a block diagram of a Radio Frequency Identification (RFID) system 1 according to an embodiment of the invention, including an RFID reader 10 and an RFID tag 12. The RFID tag 12 is a passive component without any internal power supply, wherein an internal integrated circuit is driven by a received electromagnetic wave. First, the RFID reader 10 emits an electromagnetic wave, and when the RFID tag 12 receives sufficient electromagnetic energy, it will issue tag data to the RFID reader 10. The tag data may include a unique tag serial number, or may be product-related information such as a stock number, lot or batch number, production date, or other specific information. Furthermore, the tag data may include data that was pre-stored in an Electrically-Erasable Programmable Read-Only Memory (EEPROM) on the RFID. The passive tag has the advantages of lower cost and no need for any power supply. The RFID tags on the market are mainly the passive type.

The RFID reader 10 includes a transceiver 100, a Power Amplifier (PA) 102, a Low-Noise Amplifier (LNA) 104, a directional coupler 105, and an antenna 106. The RFID tag 12 includes an antenna 122 and a passive tag 120.

The RFID reader 10 transmits an electromagnetic wave to the air through the PA 102 and the antenna 106. The antenna 122 of the RFID tag 12 receives the electromagnetic wave which contains enough energy to generate an RF response signal, and it then responds with responds the RF response signal to the RFID reader 10. The RF response signal sent by the RFID tag 12 has the same frequency as that of the transmitted electromagnetic wave, and it contains the tag information stored in the passive tag 120. Although the directional coupler 105 between the transmitting end and the receiving end has excellent electrical isolation, which enables concurrent operations at the transmitting end and the receiving end, nevertheless, the directional coupler 105 will considerably attenuate the signal received by the receiving end. Moreover, a directional coupler 105 with poor electrical isolation will result in self-jamming and adjacent/co-channel interference.

Figure 2:
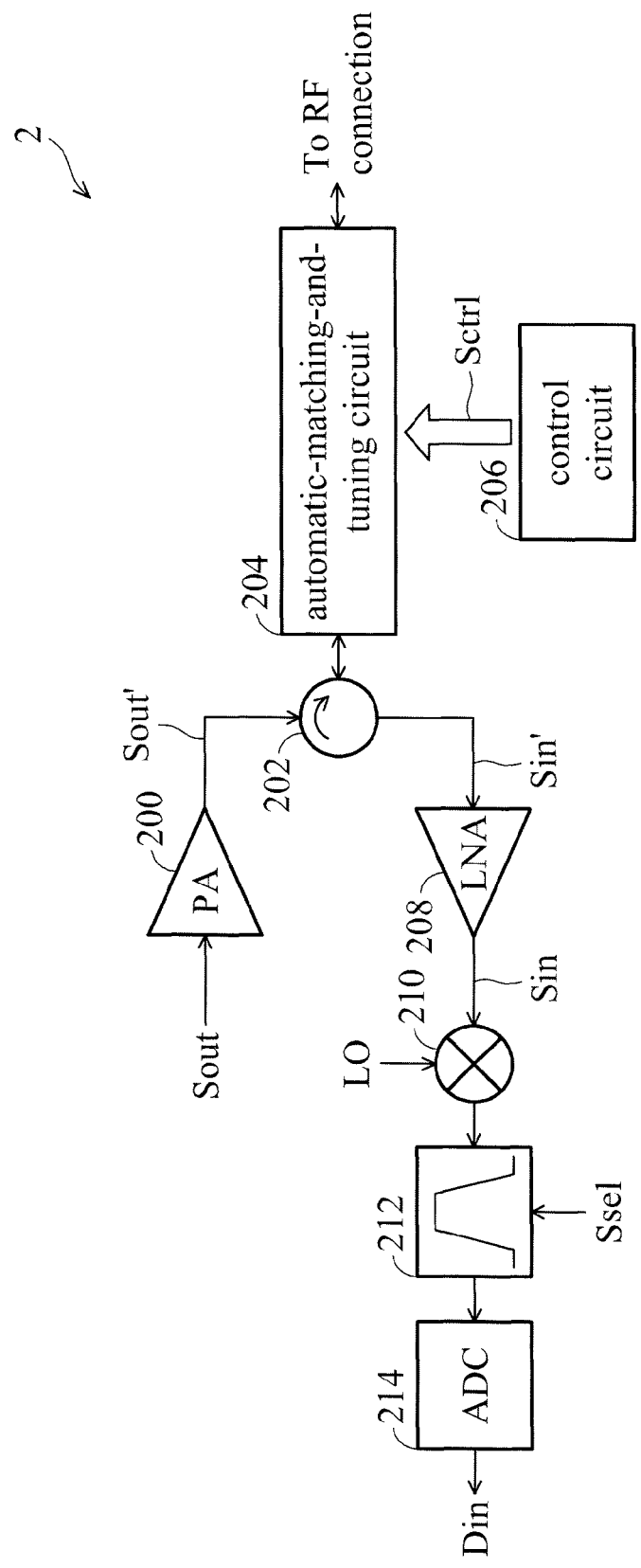
FIG. 2 illustrates a block diagram of the RFID reader 2 according to an embodiment of the invention.

The RFID reader 10 may be implemented by an RFID reader 2 in FIG. 2 which illustrates a block diagram of the RFID reader 2 according to an embodiment of the invention. The RFID reader 2 includes a Power Amplifier (PA) 200, a circulator 202, an automatic-matching-and-tuning circuit 204, a control circuit 206, a Low-noise Amplifier (LNA) 208, a mixer 210, a selectable filter 212, and an Analog-to-Digital Converter (ADC) 214.

The power amplifier 200 amplifies the power of an output signal Sout and transmits the amplified output signal Sout' (the first RF transmission signal) to an RF connection node via the circulator 202. The RF connection node includes RF routing, an RF switch, an RF cable, a winding or antenna, and so on. The amplified output signal Sout' is an RF transmission signal propagated in the air via a winding or an antenna, thereby sensing and reading one or more RFID tags (not shown) in proximity. The low-noise amplifier 208 receives an RF response signal Sin' (the first RF response signal) corresponding to the amplified output signal Sout' from the RF connection node and outputs an amplified received signal Sin. The RF response signal Sin' carries an upper-tag signal and a lower-tag signal which include the RFID tag information. The circulator 202 is coupled between the power amplifier 200 and the low-noise amplifier 208, and matches an impedance of the RF connection node. The control circuit 206 is coupled to the automatic-matching-and-tuning circuit 204, and adjusts the automatic-matching-and-tuning circuit 204 to perform impedance matching for the RF connection node and the circulator 202.

The RFID reader 2 adopts the circulator 202 to transmit the output signal Sout' from the power amplifier 200 to the RF connection node and receives the RF response signal Sin' from the RF connection node to the low-noise amplifier 208. Since the circulator 202 has good isolation between the transmission end and the receiving end and an insignificant insertion loss, the receiving path loss can be minimized, thereby effectively increasing the receiver sensitivity. Because the insertion loss is decreased, the automatic-matching-and-tuning circuit 204 is employed to provide good matching between the circulator 202 and the RF connection node of the front end, reducing a self-jamming signal caused by partial signal reflection during the transmission of the output signal Sout'.

Furthermore, because the RFID channel at Ultra High Frequency (UHF) uses a frequency-hopping mechanism, and the impedance of the RF routing in the front end is not fixed, and the impedance of the RF connection node can vary with the process variation of components, RF cable change, or antenna change on the Printed Circuit Board (PCB), a fixed matching approach cannot be adopted. The automatic-matching-and-tuning circuit 204 is incorporated to effectively reduce the self-jamming effect, and includes variable capacitive, inductive and resistive components. The control circuit 206 can adjust the automatic-matching-and-tuning circuit 204 according to the amplified received signal Sin until a minimal self-jamming is reached.

During impedance matching, the power amplifier 200 at the transmitting end can send a single-tone signal, the low-noise amplifier 208 can output a corresponding amplified output signal Sin. When the impedance match is inadequate, the low-noise amplifier 208 will receive an increased number of reflected signals of the single-tone signal and output a corresponding amplified output signal Sin. The control circuit 206 can utilize an automatic-impedance matching adjustment algorithm based on the value of the amplified output signal Sin and adjust the adjustable capacitive, inductive or resistive components in the automatic-matching-and-tuning circuit 204, to reduce the amplified output signal Sin. The control circuit 206 may perform a plurality of adjustments to reduce the amplified output signal Sin and remove the impedance mismatch between the circulator 202 and the RF connection node, thereby lowering self-jamming considerably. Therefore, the automatic-matching-and-tuning circuit 204, the control circuit 206, and the circulator 202 can effectively increase the sensitivity.

Figure 3A:
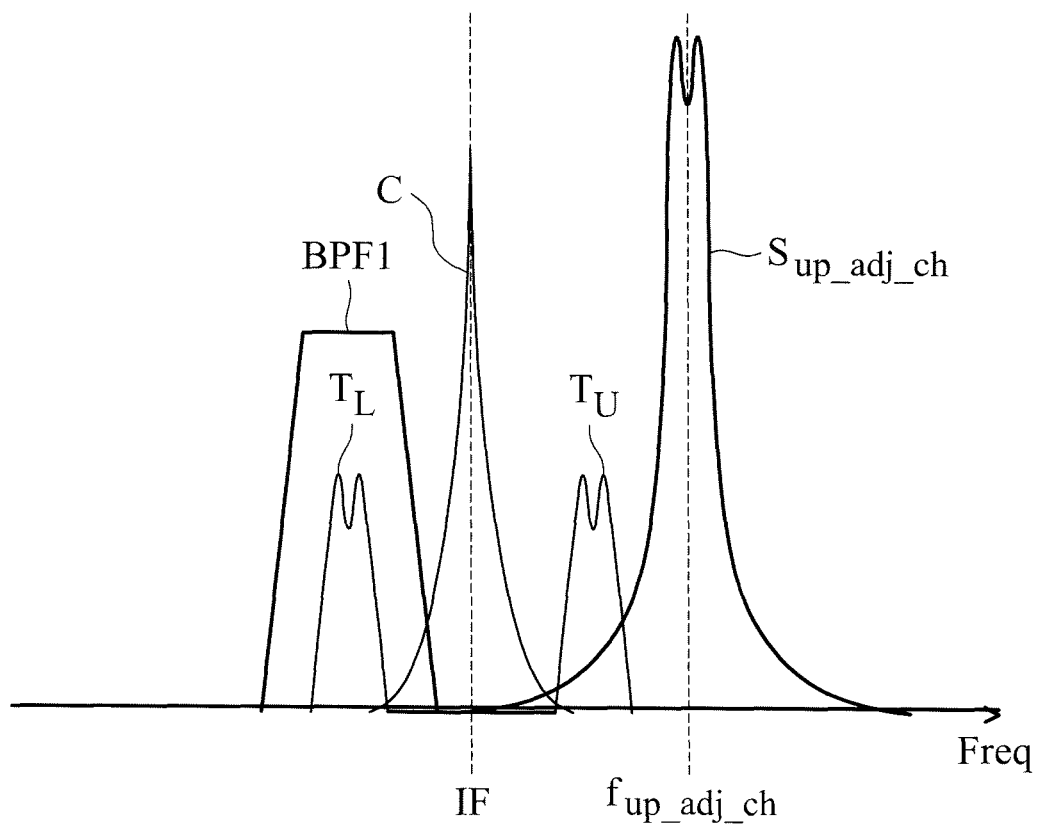
FIGS. 3A and 3B show waveforms about how the selectable filter 212 operates.
Figure 3B:
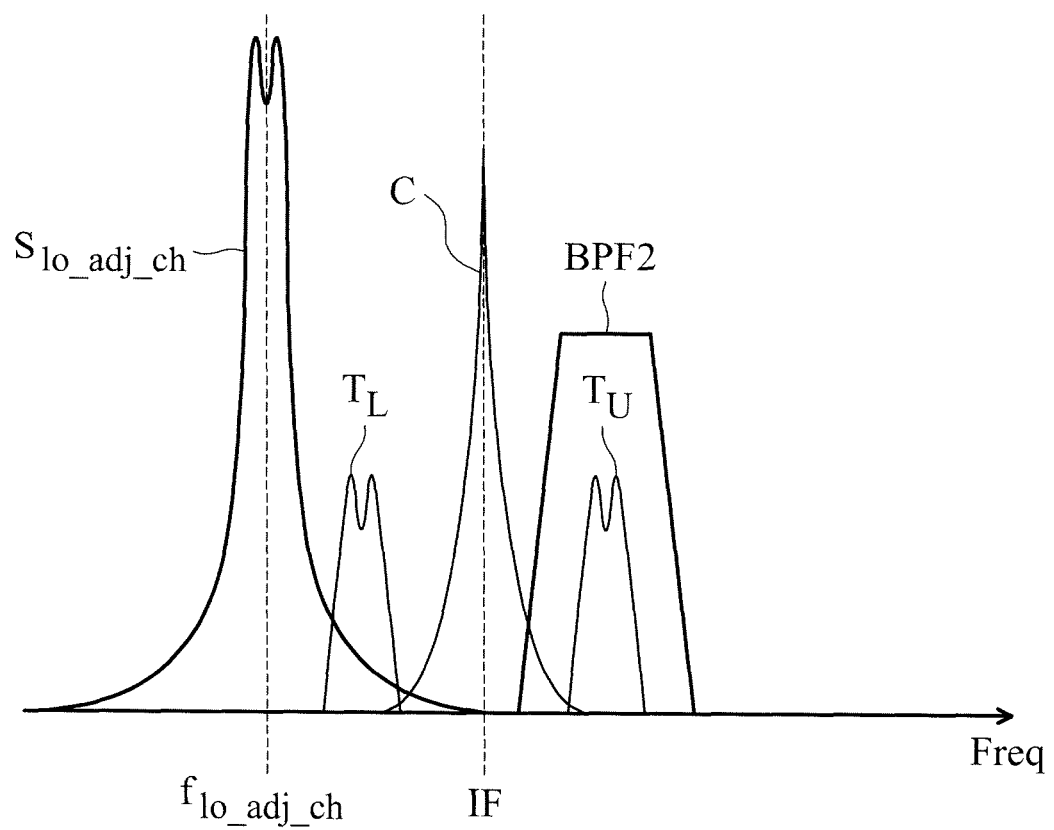

The mixer 210 receives the amplified output signal Sin from the low-noise amplifier 208, and down-converts the amplified output signal Sin to the Intermediate Frequency (IF) or Zero Frequency (ZF) range. The down-converted RF response signal Sin' carries the down-converted upper-tag signal and the down-converted lower-tag signal, both containing identical RFID tag information. The selectable filter 212 is coupled to the mixer 210, and filters the down-converted upper-tag and lower-tag signals to select a clearer one from the filtered upper-tag and lower-tag signals as an output. The analog-to-digital converter 214 is coupled to the selectable filter 212 and converts the filtered upper-tag and lower-tag signals into digital signals. Subsequently, a controller or processor can determine which one of the digitized upper-tag and lower-tag signals is clearer and select a clearer tag signal to perform further signal processing and obtain the RFID tag information. FIGS. 3A and 3B illustrate a selection method selecting the upper-tag signal and the lower-tag signal.

The selectable filter 212 is adopted to reduce adjacent channel interference. As previously mentioned, since the frequency bands of the transmission channels and tag-response channels adopted by multiple RFID reader s are close to one another, the signal interference is considerable. The conventional single filter cannot effectively filter out the signal interference, and the selectable filter 212 in the embodiment is provided to reduce or remove the adjacent channel interference.

Because UHF RFID uses a frequency-hopping mechanism, the probability of the RFID reader experiencing interference from adjacent channels to the left and right is much lower than that of the RFID reader experiencing interference from only one adjacent channel. Please refer to FIGS. 3A and 3B showing waveforms about how the selectable filter 212 operates. As shown in FIGS. 3A and 3B, since the responded upper-tag signal $T_U$ and responded lower-tag signal $T_L$ are located at the left and right with respect to the carrier frequency in the frequency domain, the left and right upper-tag signal $T_U$ and lower-tag signal $T_L$ are down-converted to the intermediate frequency and then filtered by the selectable filter 212, the filtered outputs are digitized by the analog-to-digital converter 214, and then a clearer signal is selected therefrom after a comparison. This procedure can effectively reduce the adjacent channel interference.

As shown in FIG. 3A, if the interference signal is from the higher-frequency adjacent channel $S_{up\_adj\_ch}$, then after a comparison, a digital controller or processor will determine that the lower-tag signal $T_L$ is clearer than the upper-tag signal $T_U$, and will select the lower-tag signal $T_L$ produced by the selectable filter 212 using the filtered range BPF1, or the filtered result on the left of the carrier frequency C. Conversely, As shown in FIG. 3B, if the interference signal is from the lower-frequency adjacent channel $S_{lo\_adj\_ch}$, then after a comparison, the digital controller or processor will determine that the upper-tag signal $T_U$ is clearer than the lower-tag signal $T_L$, and will select the upper-tag signal $T_U$ produced by the selectable filter 212 using the filtered range BPF2, or the filtered result on the right of the carrier frequency C.

The RFID reader disclosed in the embodiments employ a circulator to deliver the RF signal between the transmitting end and the receiving end, increasing receiver sensitivity while providing good isolation between a transmitting end and a receiving end. In addition, impedance matching between the circulator and the RF connection end can be implemented by the automatic-matching-and-tuning circuit and the control circuit, thereby reducing or removing the self-jamming. The selectable filter can select a clear signal between the filtered upper-tag and lower-tag signals as an output, thereby reducing or removing the adjacent channel interference.

Although the embodiments in FIGS. 1, 2, 3A and 3B describe the operations of an RFID system and an RFID reader, the present invention is not limited thereto. Those skilled in the art may adapt the embodiments without deviating from the principle of the present invention for other microwave single-frequency transceiver systems, such as a laser system.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general-purpose processor, a digital signal processor (DSP), an application-specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A reader, comprising:
a power amplifier, configured to output a first Radio Frequency (RF) transmission signal;
a low-noise amplifier, configured to transmit a first RF response signal according to the first RF transmission signal;
a circulator, coupled between the power amplifier and the low-noise amplifier, configured to transmit the first RF transmission signal to an RF connection node or receive the first RF response signal from the RF connection node;
an automatic-matching-and-tuning circuit, coupled to the circulator, configured to perform impedance matching between the RF connection node and the circulator;
a control circuit, coupled to the automatic-matching-and-tuning circuit, configured to adjust the automatic-matching-and-tuning circuit to perform impedance matching between the RF connection node and the circulator, the first RF response signal carrying an upper-tag signal and a lower-tag signal;
a mixer, coupled to the low-noise amplifier, configured to down-convert the first RF response signal; and
a selectable filter, coupled to the mixer, configured to filter the down-convert upper-tag and lower-tag signals, and select a clearer one from the filtered upper-tag and lower-tag signals to output.

2. The reader of claim 1, further comprising:
an analog-to-digital converter, coupled to the selectable filter, configured to digitize the filtered upper-tag signal and the filtered lower-tag signal, and determine which of the digitized upper-tag signal and the digitized lower-tag signal is clearer.

3. The reader of claim 1, wherein when the power amplifier is configured to output the first RF transmission signal, the control circuit is configured to adjust the automatic-matching-and-tuning circuit according to a self-jamming signal from the low-noise amplifier to decrease the self-jamming signal.

4. The reader of claim 1, wherein the first RF transmission signal has the same RF frequency as the first RF response signal.

5. The reader of claim 1, wherein the reader is an RFID reader.

6. An RFID reader, comprising:
a power amplifier, configured to output a first Radio Frequency (RF) transmission signal;
a low-noise amplifier, configured to transmit a first RF response signal according to the first RF transmission signal, wherein the first RF response signal carries an upper-tag signal and a lower-tag signal and the first RF transmission signal has the same RF frequency as the first RF response signal;
a mixer, coupled to the low-noise amplifier, configured to down-convert the first RF response signal;
a selectable filter, coupled to the mixer, configured to filter the down-convert upper-tag and lower-tag signals, and select a clearer one from the filtered upper-tag and lower-tag signals to output;
a circulator, coupled between the power amplifier and the low-noise amplifier, configured to transmit the first RF transmission signal to an RF connection node or receive the first RF response signal from the RF connection node,
an automatic-matching-and-tuning circuit, coupled to the circulator, configured to perform impedance matching between the RF connection node and the circulator; and
a control circuit, coupled to the automatic-matching-and-tuning circuit, configured to adjust the automatic-matching-and-tuning circuit to perform impedance matching between the RF connection node and the circulator.

7. The RFID reader of claim 6, further comprising:
an analog-to-digital converter, coupled to the selectable filter, configured to digitize the filtered upper-tag signal and the filtered lower-tag signal, and determine which of the digitized upper-tag signal and the digitized lower-tag signal is clearer.

8. The RFID reader of claim 6, wherein when the power amplifier is configured to output the first RF transmission signal, the control circuit is configured to adjust the automatic-matching-and-tuning circuit according to a self-jamming signal from the low-noise amplifier to decrease the self-jamming signal.

* * * * *